US012137010B2

(12) United States Patent
Brink et al.

(10) Patent No.: US 12,137,010 B2
(45) Date of Patent: Nov. 5, 2024

(54) NETWORK NODE IDENTIFICATION USING WIRELESS SIGNAL SIGNATURES

(71) Applicant: NXP B.V., Eindhoven (NL)

(72) Inventors: Klaas Brink, Waalre (NL); Vincent Pierre Martinez, Venerque (FR); Cornelis Marinus Moerman, Waalre (NL)

(73) Assignee: NXP B.V., Eindhoven (NL)

( * ) Notice: Subject to any disclaimer, the term of this patent is extended or adjusted under 35 U.S.C. 154(b) by 262 days.

(21) Appl. No.: 17/661,762

(22) Filed: May 3, 2022

(65) Prior Publication Data

US 2022/0368567 A1   Nov. 17, 2022

(30) Foreign Application Priority Data

May 17, 2021   (EP) .................................... 21305641

(51) Int. Cl.
*H04L 9/00* (2022.01)
*H04L 9/40* (2022.01)
*H04L 25/02* (2006.01)

(52) U.S. Cl.
CPC ...... *H04L 25/0212* (2013.01); *H04L 63/1425* (2013.01)

(58) Field of Classification Search
CPC .......................... H04L 25/0212; H04L 63/1425
USPC ......................................................... 726/23
See application file for complete search history.

(56) References Cited

U.S. PATENT DOCUMENTS

| 2011/0267190 | A1 | 11/2011 | Payson et al. | |
|---|---|---|---|---|
| 2013/0135110 | A1 | 5/2013 | Xie et al. | |
| 2018/0219840 | A1* | 8/2018 | Quaglia | H04L 63/045 |
| 2020/0228934 | A1* | 7/2020 | HomChaudhuri | H04W 4/06 |

FOREIGN PATENT DOCUMENTS

| CN | 104918249 A | 9/2015 |
|---|---|---|
| WO | 2018005631 A | 1/2018 |
| WO | WO 2020/182849 A1 * | 3/2019 |
| WO | WO 2021/222662 A1 * | 4/2020 |

OTHER PUBLICATIONS 802.15.4-2015/Cor Jan. 2018, "IEEE Standard for Low-Rate Wireless Networks Corrigendum 1", Jul. 9, 2018.
Zhao, C., "A PHY-layer Authentication Approach for Transmitter Identification in Cognitive Radio Networks", 2010 International Conference on Communications and Mobile Computing, Apr. 12-14, 2010.
Geron, A., "Hands-on Machine Learning with Scikit-Learn, Keras and TensorFlow", Second Edition, published by O'Reilly Media, Inc., Jun. 2019.

(Continued)

*Primary Examiner* — Christopher J Brown

(57) ABSTRACT

A battery pack comprises an enclosure; a plurality of network nodes that communicate with each other inside the enclosure and that generate a unique radio frequency (RF) signature; and a special-purpose computer processor that compares an incoming channel impulse response (CIR) of the unique radio frequency (RF) signature corresponding to an incoming packet to a plurality of stored valid RF CIR signatures and executes a resemblance metric to accept or reject the incoming packet.

22 Claims, 7 Drawing Sheets

(56) References Cited

OTHER PUBLICATIONS

Ledergerber, A., "Angle of Arrival Estimation based on Channel Impulse Response Measurements", 2019 IEEE/RSJ International Conference on Intelligent Robots and Systems (IROS), Nov. 4-8, 2019.

Matthews, B., "Understanding and Prediction of Ultra-Wide Band Channel Impulse Response Measurements", 4th KuVs/GI Expert Talk on Localization, Jul. 15, 2019.

Tugnait, J., "A Channel-Based Hypothesis Testing Approach to Enhance User Authentication in Wireless Networks", 2010 Second International Conference on Communication Systems and Networks (COMSNETS 2010), Jan. 5-9, 2010.

Volkswagen Group News—Press Release "In Brief: Key components for a new era—the battery system", https://www.volkswagen-newsroom.com/en/press-releases/in-brief-key-components-for-a-new-era-the-battery-system-5645, Dec. 5, 2019.

\* cited by examiner

| Actual Sender | Recipient | Reported Sender | Received Message Signature | Stored Signature | Message sent from claimed sender? |
|---|---|---|---|---|---|
| 102A1 | 102A4 | From_102A1 | | | Yes |
| 102X1 | 102A4 | From_102A1 | | | No |
| 102A8 | 102A1 | From_102A8 | | | Yes |
| 102X1 | 102A1 | From_102A8 | | | No |

FIG. 4

NETWORK NODE IDENTIFICATION USING WIRELESS SIGNAL SIGNATURES

CROSS-REFERENCE TO RELATED APPLICATIONS

This application claims the priority under 35 U.S.C. § 119 of European Patent application no. 21305641.9, filed on 17 May 2021, the contents of which are incorporated by reference herein.

FIELD

The present disclosure relates generally to ultra-wideband (UWB) wireless technology, and more specifically, to wireless battery management system security.

BACKGROUND

Battery management systems (BMS) include an electronic system deployed in industrial or automotive applications to control the operation of a battery pack comprising an array of lithium chemistry cells or the like to determine a safe operating area within which the battery pack provides the best performance.

Wireless battery management systems (WBMS) can replace the wired control links of a BMS with a wireless connection, thereby eliminating the need for wiring and volume in the battery pack. However, the use of radio frequency (RF) communications opens up the possibility of malicious cyberattacks. Therefore, security provisions are required in the design of a WBMS to assure that the WBMS enjoys comparable safety and security as a wired BMS.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 is a table illustrating a comparison of fingerprints of messages received by battery pack modules and stored message signatures, in accordance with some embodiments.

DETAILED DESCRIPTION

It is desirable for the modules of a WBMS that exchanges messages over an RF link require a high level of trust, i.e., message authenticity is guaranteed and originates from a battery management unit (BMU) or battery cell controller (BCC) of the WBMS.

In brief overview, embodiments of the present inventive concepts include systems and methods for identifying network nodes based on channel characteristics. Electric vehicle (EV) battery cell configurations, e.g., arrays of battery cells in the form of modules or the like, each typically having a fixed antenna positioned in an enclosure. The CIR of the communication channel between two RF nodes, or modules, is unique as a result of the fixed spatial arrangement of the modules in the battery pack. Unique CIR characteristics are pre-programmed in each RF module during manufacturing or service. During operation, the CIR is obtained and processed for each newly received RF message. The CIR is used as a signature when receiving a new packet. In some embodiments, a resemblance metric such as an Error Vector Magnitude (EVM) is calculated for the programmed CIR and the CIR of the received message. The CIR is compared to a set of valid RF CIR signatures to determine whether the calculated EVM value should reject or accept the newly received message due to interference or attack. The RF channel characteristics of a valid node cannot be easily measured externally to the battery pack enclosure. Thus, the RFS cannot be reconstructed and therefore cannot be misused using external measurement techniques.

In other embodiments, machine learning algorithms may be implemented and executed by a wireless battery management system. For example, Neural Network (NN) or Support Vector Machine (SVM) classifiers or the like may be applied to a measured CIR feature set, e.g., data related to CIR area, peaks, peak position, spectral power, distance, magnitude, prominence, phase, and or other features characterizing unique signature properties of an RF signal.

Figure 1:
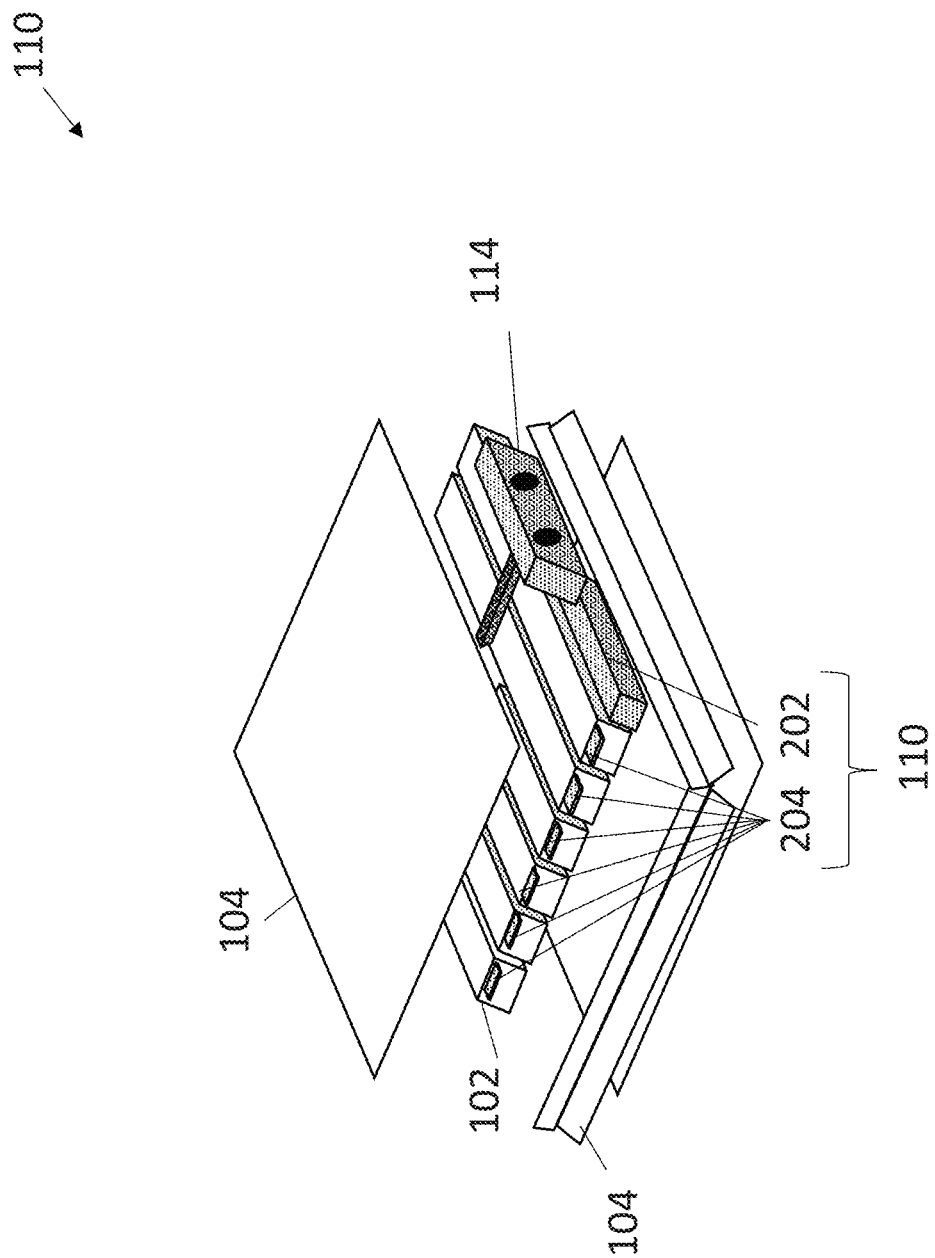
FIG. 1 is an exploded view of a battery pack in which one or more disclosed embodiments may be implemented.
Figure 2:
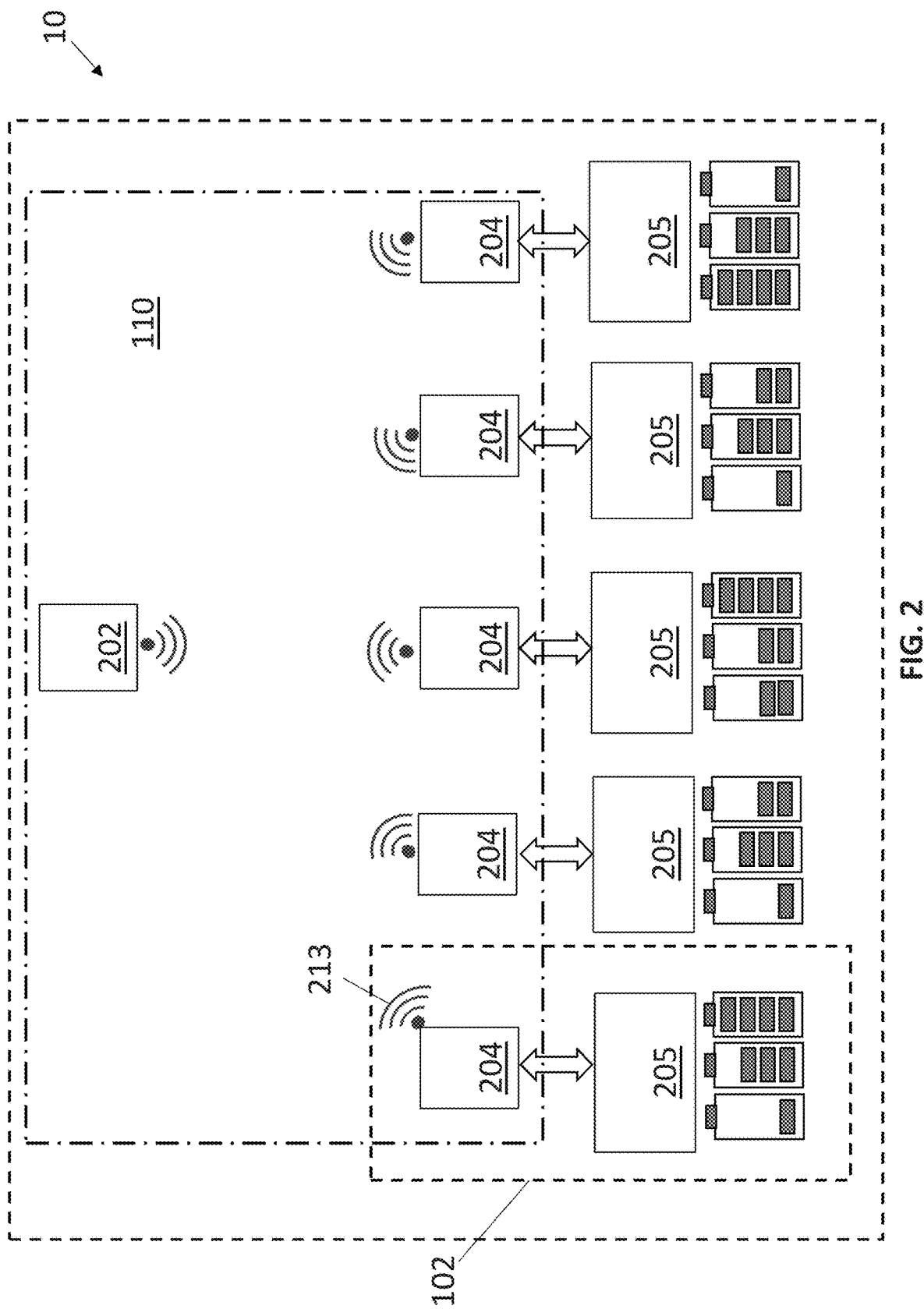
FIG. 2 is a system diagram of an example of a wireless battery management system (WBMS) in which one or more disclosed embodiments may be implemented.

As shown in FIG. 1, a battery pack 10 typically includes a plurality of individual battery cell modules 102 and a WBMS 110. The battery pack 10 can also include other components not shown such as a power supply and so on. As shown in FIG. 2, each module 102 may include a plurality of battery cells 205, e.g., arranged as arrays, clusters, or the like. As described herein, each module 102 may also include a battery cell controller (BCC) 204 of a WBMS 110 for monitoring the corresponding cells 205. As also shown, the individual battery cell modules 102 have fixed positions and are positioned in a metal enclosure or housing 104. The modules 102 may be electrically coupled to each other by a connector strip 114, which may also have interfaces for communicating with external electronic components.

Figure 3:
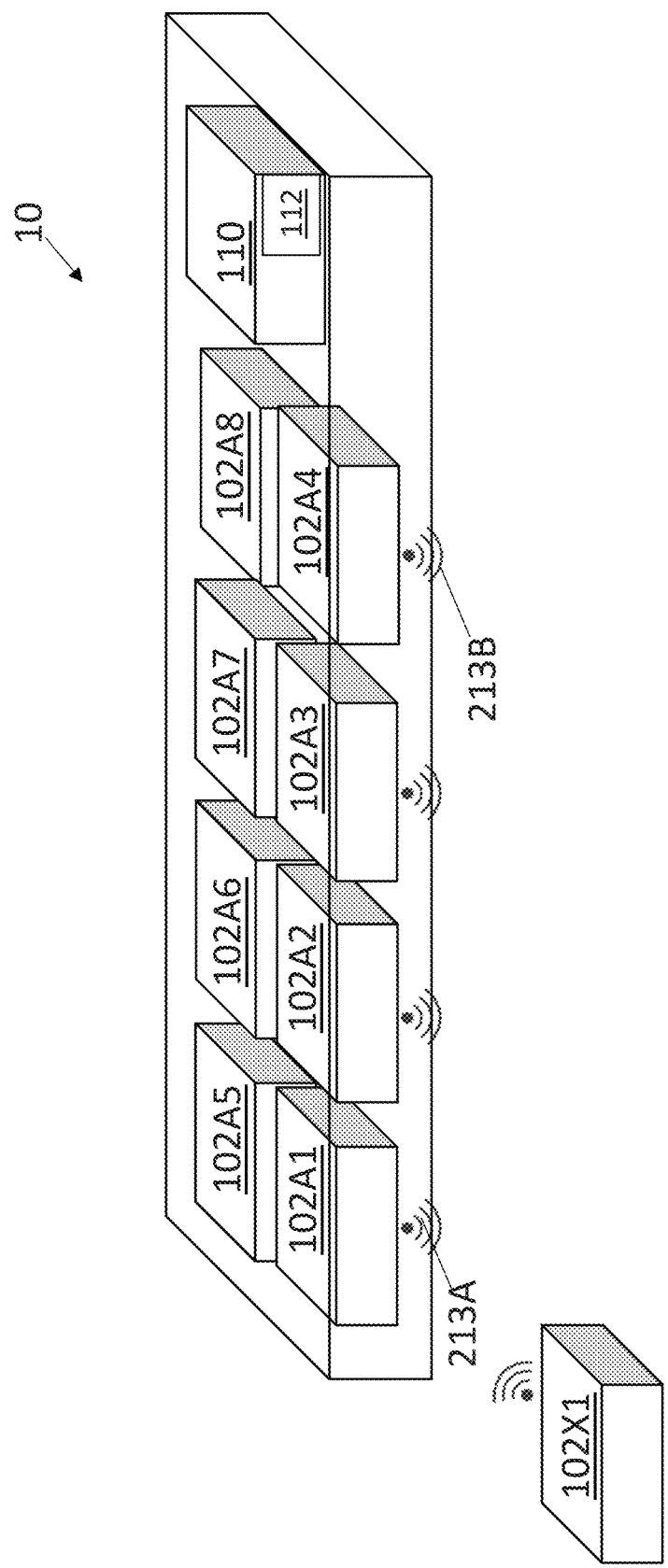
FIG. 3 is a conceptual diagram of the battery pack of FIG. 1 including a plurality of WBMS modules communicating wirelessly, in accordance with some embodiments.

In some embodiments, the metal enclosure 104 is crash-proof, ruggedized, or otherwise constructed and arranged for protecting its contents including the modules 102 from external elements that would otherwise damage the contents that are otherwise sensitive to the external elements. As a consequence, the RF channel characteristics are unique for each module given the spatial distribution of the modules in the battery pack 10. Any RF signal externally entering the battery pack 10, e.g., also shown in FIG. 3, is subject to attenuation, distortion, or the like that differs significantly compared to the characteristics of the RF links between the modules 102 inside the enclosure 104. The connector strip 114 may include a galvanically isolated transmission line providing a point-to-point signal transmission path between the BCC nodes 204. The BCCs 204 communicate inside a battery pack 10 and can measure the voltage for each cell, pack current and temperatures. It also handles the balancing circuitry that improves the pack health by equalizing the cell states of charge.

Although the WBMS 110 is shown as an example, the concept can be applied to general wireless systems implemented in other industrial, commercial, or automotive applications including battery management. In some embodiments, the WBMS 110 is an ultra-wideband (UWB) WBMS. As shown in FIG. 2, the WBMS 110 includes a plurality of BCCs 204, for example, each BCC 204 responsible for the management of at least one cell module 102, or node. The nodes 102 include hardware, software, or a combination thereof for exchanging data, e.g., packets, messages, and so on wirelessly with a battery management unit (BMU) 202 (see FIG. 2). The BMU 202 may be a master node of a wireless network star topology, and the BCCs 204 may be slave connecting nodes. The communications illustrated and described herein can comply with a communication protocol having a physical layer formed between physical interfaces of a BMU and a high number of BCC nodes.

In the enclosure, each module 102 of a BMS has a-priori knowledge of characteristics or other details of the channel "fingerprint," or "signature," of the other modules in the battery pack 10, in order for the module 102 to verify its authenticity through the contents of a received RF message, e.g., public-private key encryption and signature. Here, imperfections in an electromagnetic signal, e.g., an RF signal but not limited thereto, such as noise, offset, and so on are generated by the circuitry, and captured in a CIR, to obtain a "fingerprint" of the wireless device, which cannot be imitated by other electronic devices. In some embodiments, additional trust can be provided by the verification of the channel fingerprint of the received message, e.g., the conditions under which it was received.

As described herein, the wireless channels between the nodes, for example, specific modules 102 of the WBMS 110 inside the enclosure 104 of the battery pack 10, has a unique RF signature (RFS), which can be used to verify that a received message is output from a valid WBMS node 104. Because the RF channel characteristics of the nodes 104 inside the enclosure 104 cannot be measured externally to the battery pack 10, a feature of the present inventive concepts is that the channel fingerprint of the received message cannot be reconstructed and imitated by other electronic devices representing themselves as wireless nodes for malicious or illicit purposes using external measurements.

For example, given the nature of the enclosure 104, the components of a battery pack 10 are not accessible from the external environment. Therefore, no measurement equipment can be installed/mounted by a malicious attacker inside the battery pack 10, e.g. to measure the channel between the BMU and a particular BCC. Furthermore the enclosure 104 is assumed to cause significant attenuation and distortion of the RF-signals that are present inside the battery pack 10, which implies that when measurement equipment is located outside the battery pack it is impossible to measure channel characteristics such shown in FIGS. 5A and 5B.

Accordingly, battery pack 10 is constructed and arranged to prevent the revealing of channel characteristics to external observers to such an extent that these are externally measurable.

For example, referring to FIGS. 3 and 4, a battery pack 10 includes modules 102A1-102A8 (generally, 102 shown in FIG. 1) that communicate wirelessly. Module 102X1 represents a malicious module external to the battery pack 10 that sends messages to the battery pack 10 with the intent controlling operation of the WBMS 110. The table 400 shown in FIG. 4 illustrates how a fingerprint of a newly received message is compared to the stored signature resulting in a rejection of any message from module 102X1 because of a determined mismatch from the comparison. The channel fingerprint therefore provides additional trust to existing security mechanisms, such as public-private key encryption.

There are well-known message signing and encryption methods that provide strong security in itself. By applying such well-known message signing and encryption methods for wireless communication between the BMU 202 and BCCs 204, a high-level of security can be achieved. Further, the unique characteristics of the RF channel between two nodes in the battery pack can be used, i.e., processed, to verify that a message of interest is indeed received from the correct node.

Figure 5B:
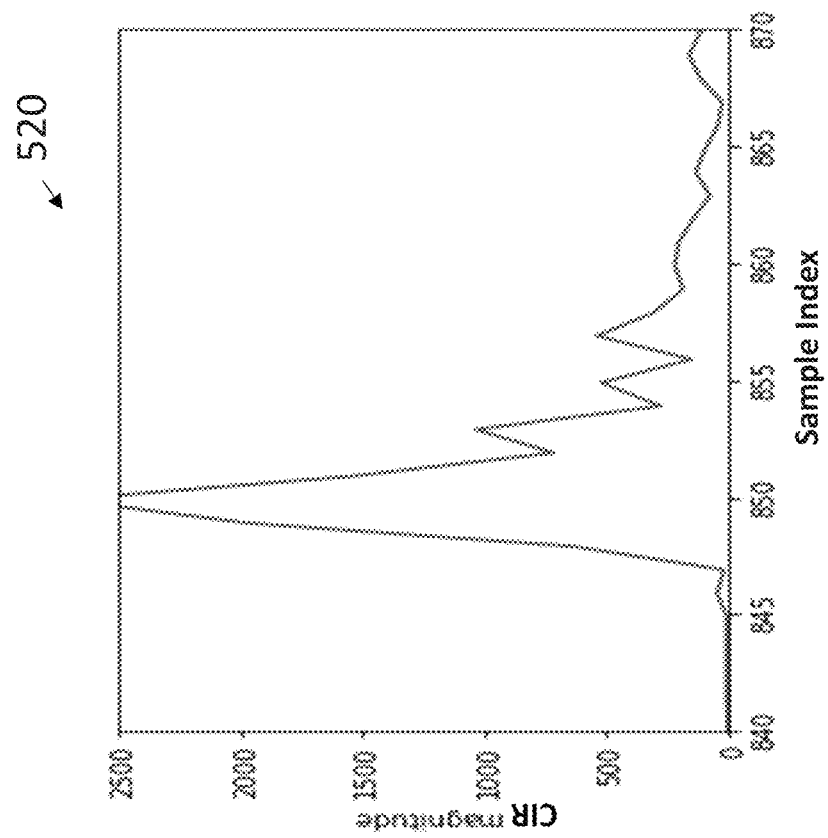
FIGS. 5A and 5B are graphs illustrating channel impulse response signals (CIR) of a communication channel of a message received via a wireless communication link of a WBMS, in accordance with some embodiments.
Figure 5A:
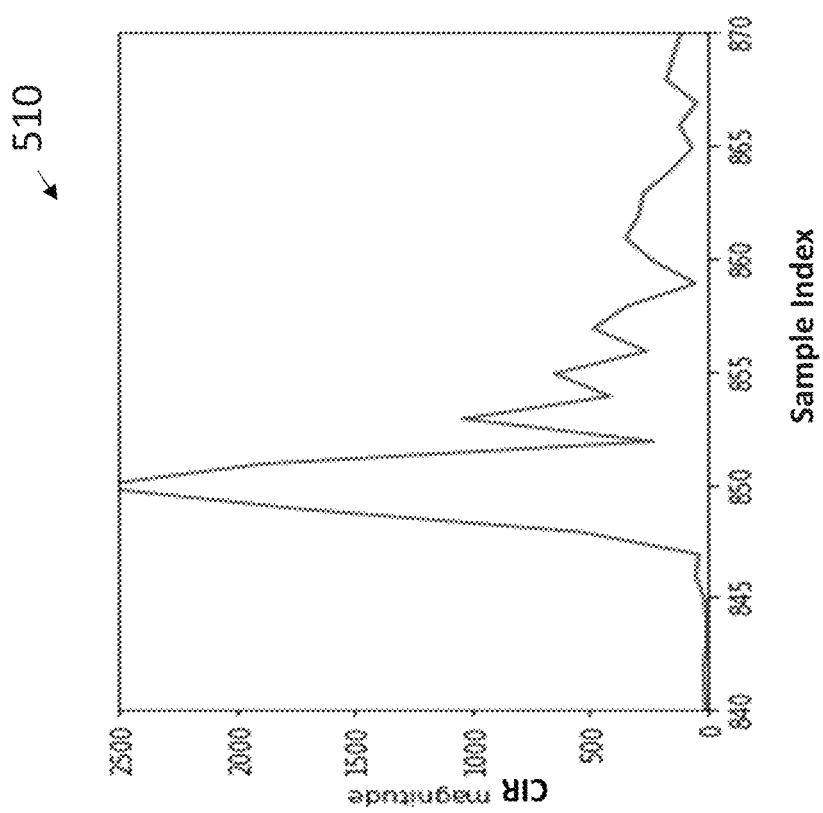

For example, referring to FIGS. 5A and 5B, a CIR for the channel between a node 102A1 in FIG. 5A and a BMU 202 and a node 102X1 in FIG. 5B and the BMU 202. Both nodes could send the same encrypted message, e.g. claiming it was sent by node 102A1. By comparing the measured CIR at the BMU 202 with a previously-stored CIR of nodes 102A1, 102X1, the BMU 202 can conclude that only one of the two message originates truly from trusted node 102A1, and the other message from node 102X1 does not. The additional CIR based comparison therefore provides additional trust by requiring the message to be sent by a node at a specific (spatial) location.

As previously described, the spatial arrangement of the transmit and receive, e.g., transceivers, of the modules 102, more specifically, antennas thereof, with their environmental context characteristics determine the uniqueness of the CIR of a channel between the modules 102. A RF context is sufficiently specific causing the context characteristics to be further pronounced, for example, due the high number of reflections in the battery pack enclosure 104, e.g., shown in the CIR graphs 510, 520 of FIGS. 5A and 5B, respectively. Here, impulse responses are captured with a 2.4 Ghz center frequency, but not limited thereto. An identification can apply to any wireless technology, such as UWB but not limited thereto. Certain kinds of changes in the RF context (due to a failure) are most likely detectable because of a change in the RF signal characteristics and could be used to generate a safety-/recovery- or diagnostic trigger. For example, the uniqueness in a CIR characteristic may be indicated by slow environment changes which may be tracked by the system. In another example, a unique CIR characteristic may signal an immediate high rate change in CIR between subsequent messages indicating a problem. In another example, messages may be prioritized accordingly by checking the CIR only for the class of highest importance.

FIG. 4 is a table 400 that illustrates how the fingerprint of a received message is compared to a stored signature and any message from a malicious node 102X1 is rejected due to a mismatch.

The first and second columns of the table 400 identify the actual sender and recipient battery pack modules of a message. The third column identifies a claimed sender of the message. The message contents include the claimed sender, which may instead be a malicious actor. The fourth through sixth columns illustrate an example of a procedure for comparing the fingerprint of the received message and the stored signature and rejection of a message from the malicious node, e.g., 102X1 because of a determined mismatch.

In some embodiments, the channel fingerprint can be programmed into a memory device of the system during manufacturing or as service operation. A recipient of the message, i.e., a module 102 of the battery pack, or the RF characteristics, can be compared to the stored fingerprint, and a generated result, e.g., indicating a mismatch, can be used to reject received from the malicious node 102X1. Messages originating from the intruder RF node 102X1 can be rejected because the characteristics of the RF signal do not match the stored signature.

In other embodiments, in addition to providing additional trust and depending on the accuracy of the RF characteristics mentioned above, other users may include automatically detecting the order of sub-modules in the battery pack. For example, the battery modules 102 are arranged in series to provide the voltage required by the application, for example, automotive UWB chips but not limited thereto. The precise position of a particular string of batteries can be determined and known to the BMU 202, for example, by preprogramming the BMU 202 during manufacturing. A unique RF signature associated with each position of a battery module 102 allows the BMU 202 to detect the order of the battery modules 102 automatically.

In other embodiments, a detection by the WBMS 110 in the change in RF signal characteristics may be an indication of a failure, for example, the enclosure was damaged or the ambient temperature is dangerously high. Certain types of RF context due to failure are detectable because of the change in the RF signal characteristics and can be used to generate a safety, recovery, or diagnostic trigger. Accordingly, the WBMS 110 may further include such triggers and can be used in applications related to failure detection.

Figure 6:
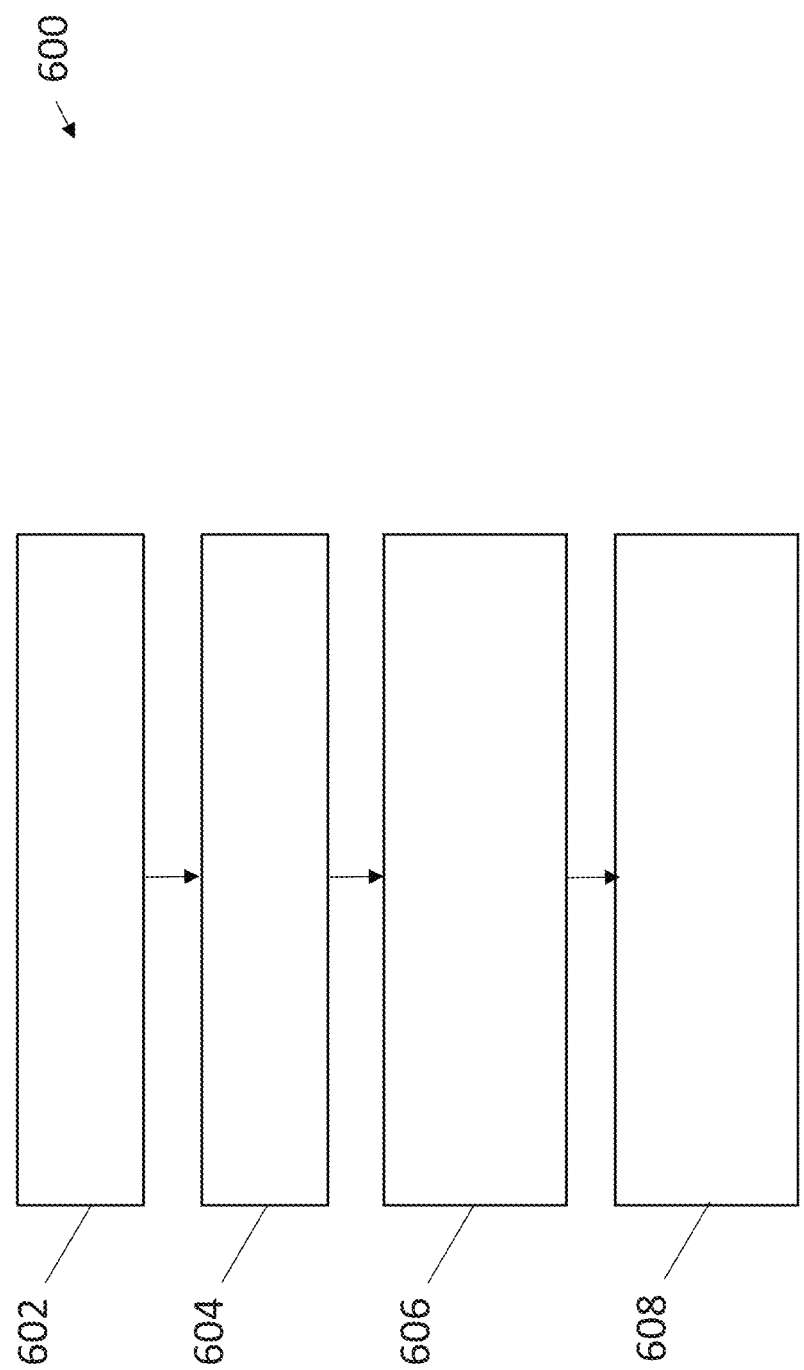
FIG. 6 is a flow diagram of a method for network node identification according to channel characteristics, in accordance with some embodiments.

FIG. 6 is a flow diagram of a method 600 for network node identification according to channel characteristics, in accordance with some embodiments. In describing the method 600, reference is made to elements of FIGS. 1-5. For example, some or all of the method 600 may be performed in the battery pack 10 of FIGS. 1-3, in particular, a special purpose processor 112 of the WBMS 110. The processor 112 may be hardware, software, or a combination thereof, e.g., a signal processor (DSP). In some embodiments, the special purpose processor 112 is part of the BMU 202, the BCCs 204, a combination thereof.

At block 602, an RF module 102 receives in a wireless communication from another module 102 an electronic message. The CIR of the communication channel formed between a transmitting module and a receiving module is unique, due at least in part to the fixed spatial arrangement of antennas 213 in an enclosure in which the transmitting and receiving modules are co-located, e.g., distance, orientation, and so on, which cause the CIR characteristics to be further pronounced, i.e., unique. The unique CIR characteristics are also known and preprogrammed, e.g., stored in memory, during manufacturing or service because of the fixed and known arrangement of modules 102 inside the enclosure 104.

At block 604, a CIR is obtained for a newly received RF message, e.g., received in the form of a data packet from an RF module 102.

At block 606, the newly received CIR is compared to a bank of stored valid RF CIR signatures, e.g., the known and unique CIR characteristics preprogrammed after measuring the measuring the CIRs between the modules during manufacturing, replacement of battery cells during maintenance, and so on. The comparison may be performed by a resemblance metric such as an EVM technique.

At block 608, a resemblance metric is calculated. In some embodiments, the resemblance metric is executed at the special purpose processor 112 of the WBMS 110. In other embodiments, the input data (received CIR, stored preprogrammed CIRs) is provided to an external processor which executes an algorithm for performing the calculations. In some embodiments, the EVM metric between the CIR of the new packet and a reference CIR, for a range of IQ samples (i) is performed according to equation (1)

$$EVM_{(t,s)} = \frac{1}{N_{samples}} * \sqrt{\frac{\sum_{i=0}^{N_{samples}-1} \left|CIR\_normalized_{new\ packet_{(i)}} - \sum_{i=0}^{N_{samples}-1} CIR\_normalized_{reference\ packet_{(i)}}\right|^2}{\sum_{i=0}^{N_{IQ}-1} \left|CIR\_normalized_{new\ packet_{(i)}}\right|^2}} \quad (1)$$

Where N samples is the number of samples of the CIR (for example 1024).

Where $CIR\_normalized_{new\ packet_{(i)}} = \dfrac{CIR_{new\ packet_{(i)}}}{\max\left(CIR_{new\ packet_{(j)}}; j \in [0:N_{samples}]\right)}$ is the CIR of the new packet, normalized (both in phase and amplitude) by its peak value (in terms of amplitude).

Where $CIR\_normalized_{reference\ packet_{(i)}} =$ $$\frac{CIR_{new\ packet_{(i)}}}{\max(CIR_{reference\ packet_{(j)}}; j \in [0:N_{samples}])}$$

is the reference, normalized (both in phase and amplitude) by its peak value (in terms of amplitude). Where t is the reference transmitter index. For example, the WBMS 110 can include ten (10) such trusted transmitters but not limited thereto. t ranges from 0 to $N_{transmitters}-1$. Where s is a reference CIR from transmitter index t. For example, the CIR bank may contain several (100 for example) reference CIR for each trusted transmitter. s ranges from 0 to $N_{ref\ CIR\ per\ transmitter}-1$.

Here, the EVM measures the average delta between the CIR of the new packet and the reference CIR. The EVM value can be calculated by the BMU 202, the BCC 204, and/or the special-purpose processor 112, which as described above can be part of the BMU 202 and/or the BCC 204, or otherwise part of the WBMS 110. Here, the BMU 202 can verify that a received message originates from a valid BCC node 204. The BCC node 204, on the other hand, can verify that the message indeed originates from the BMU 202.

Once the $EVM_{(t,s)}$ measurements are computed, the smaller $EVM_{(t,s)}$ value across all t and s ranges is selected: $EVM_{(t_{min},s_{min})}$. The index $t_{min}$ indicates the most trusted transmitter if could have been sent to.

Figure 7B:
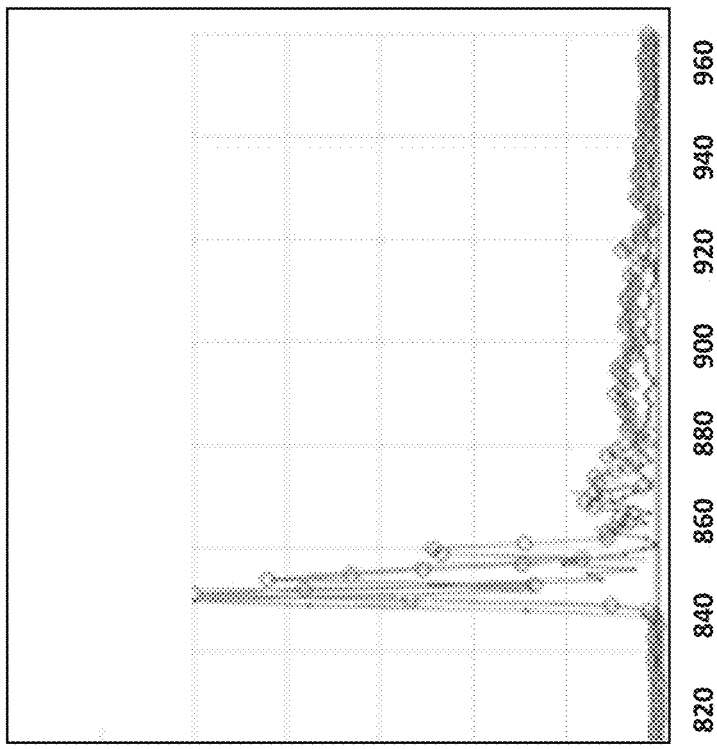
FIGS. 7A and 7B are graphs illustrating comparisons between input signature signals and reference signature signals produced by RF modules wirelessly communicating with each other in a battery pack, in accordance with some embodiments.
Figure 7A:
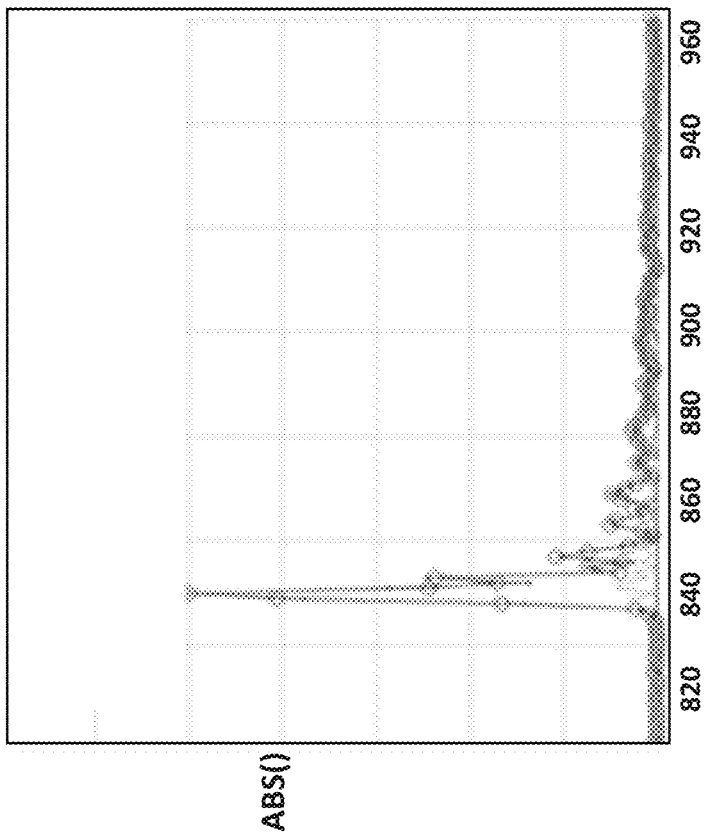

Referring again to block 608 of the method 600, in some embodiments, $EVM_{(t_{min},s_{min})}$ is compared to a precomputed EVM_threshold.

if EVM<EVM_threshold, the new packet is considered as a trusted receipt of data.

if EVM≥EVM_threshold, the new packet is considered as a NOT trusted packet (either an attack or an interfering signal). FIG. 7A illustrates an example of a graph 710 of a received CIR matching a reference CIR. FIG. 7B illustrates an example of a graph 720 where a received CIR does not match a reference CIR.

As described above, the uniqueness in a CIR characteristic may be indicated by slow environment changes which may be tracked by the system. A resemblance metric in accordance to some embodiments can be executed for adaptation to slowly changing environments. When implementing an EVM resemblance metric, a collection of CIRs from previously transmitted messages must be available for comparing an incoming CIR to these reference CIRs. In a static environment, such references, e.g., 100 valid messages per authorized transmitter, can be generated at start-up during an initialization phase, and are not modified at a later time. However, in a slowly changing environment, the 'collection' of valid references can be continuously updated, to ensure adaptability. Every time a new packet is authenticated as a valid packet, its CIR is saved into a memory, for example, a first-in first-out (FIFO) device. The FIFO can be designed to hold for example the last 100 valid messages per authorized transmitter. In some embodiments, a FIFO can represent a window of a few seconds.

In some embodiments, a machine learning (ML) neural network similarity method or the like may be implemented. For example, a convolutional neural network (CNN), 3-layer NN, or the like provides multidimensional mappings and can achieve fingerprinting accuracy levels impossible to achieve by traditional low-dimensional algorithms. In some embodiments, a machine learning algorithm is implemented that maps the measured RF characteristics or other CIR data described herein on a transmitter location, for example, using a python scripts based on the scikit-learn ML-package or related mapping tool. For example, a received CIR may have a first peak that provides an estimation based on the CIR measurement. The magnitude and phase value may be used for a neural network-based classification.

Accordingly, a WBMS can combine computer-executed machine learning processes with features of a measured CIR. For example, one application of a machine learning technique includes a classification algorithm to characterize the RF channel between the BMU and a particular BCU inside the battery pack. The machine learning approach recognizes that a CIR has characteristics or features, which identifies the CIR as unique with respect to various locations inside the battery pack.

As will be appreciated, embodiments as disclosed include at least the following. In one embodiment, a battery pack comprises an enclosure; a plurality of network nodes that communicate with each other inside the enclosure and that generate a unique radio frequency (RF) signal signature; and a special-purpose computer processor that compares an incoming channel impulse response (CIR) of the unique RF signal signature corresponding to an incoming packet to a plurality of stored valid RF CIR signatures and executes a resemblance metric to accept or reject the incoming packet.

Alternative embodiments of the battery pack include one of the following features, or any combination thereof.

The network nodes are modules formed of an arrangement of battery cells.

The CIR of the unique RF signature is generated by a fixed spatial arrangement between an antenna of a transmitting module of the network nodes and an antenna of a receiving module of the network nodes inside the enclosure.

The incoming packet is received from an external malicious node, and the resemblance metric performs a calculation that compares a CIR of the incoming packet from the external malicious node to the plurality of stored valid RF CIR signatures to determine that the incoming packet is not a trusted packet.

The resemblance metric includes an Error Vector Magnitude (EVM) calculated for the CIR of the unique RF signature communication channel. The special-purpose computer processor compares the EVM to a threshold value to determine whether the incoming packet is a trusted packet or an untrusted packet. The trusted packet is generated from the battery cell controller of a network node inside the enclosure and the untrusted packet is generated from a wireless device external to the enclosure.

In response to comparing the measured CIR at a battery management unit, with a previously-stored CIR of two nodes, the battery management unit establishes that one of the nodes provides a message in the incoming packet that is trusted.

The resemblance metric is generated by a machine learning technique that characterizes the incoming channel impulse response (CIR).

The resemblance metric is generated by a machine learning technique that characterizes the incoming channel impulse response (CIR).

The special-purpose computer processor executes the resemblance metric for adaptation to slow changes in an RF signal of the incoming packet caused by the environment inside the enclosure.

The plurality of stored valid RF CIR signatures include previous CIR signatures of the network nodes inside the enclosure, and wherein the special-purpose computer processor compares the incoming CIR to the previous CIR signatures to require the incoming packet to be sent from a predetermined known spatial location.

In another embodiment, a wireless battery management system of a battery pack comprising: at least one battery cell controller that monitors at least one battery cell of the battery pack; and a battery management unit that manages the at least one battery cell controller; and a special purpose processor that compares a CIR signature of a message from the at least one battery cell controller with a plurality of stored valid CIR signatures and executes a resemblance metric to accept or reject the message.

Alternative embodiments of the wireless battery management system include one of the following features, or any combination thereof.

The plurality of stored valid CIR signatures includes a previously-stored CIR of each of two nodes, and wherein the battery management unit establishes that one of the two nodes provides a message in the incoming packet that is trusted.

The at least one battery cell controller measures at least one of a voltage, a pack current, and a temperature of the at least one battery cell in the battery pack.

In response to the message received from an external malicious node, the resemblance metric performs a calculation that compares a CIR of the message received from the external malicious node to the plurality of stored valid RF CIR signatures to determine that the incoming packet is not a trusted packet.

The resemblance metric includes an Error Vector Magnitude (EVM) calculated for the CIR signature.

the battery management unit compares the EVM to a threshold value to determine whether the incoming packet is a trusted packet or an untrusted packet.

The resemblance metric is generated by a machine learning technique that characterizes the CIR.

In another embodiment, a method for network node identification according to channel characteristics comprises receiving, by a first RF module (102A) in an enclosure an electronic message from a second RF module, the message having a unique CIR signature; comparing the unique CIR signature to a plurality of stored valid CIR signatures; and generating a resemblance metric to accept or reject the electronic message in response to the comparison of the unique CIR signature and the plurality of stored valid CIR signatures.

Alternative embodiments of the wireless system include one of the following features, or any combination thereof.

The resemblance metric includes an Error Vector Magnitude (EVM) calculated for the unique CIR signature, and the method further comprises comparing the EVM to a threshold value to determine whether the message is part of a trusted packet or an untrusted packet.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A battery pack, comprising:
an enclosure;
a plurality of network nodes inside the enclosure, each network node having at least one battery cell and a battery cell controller that generates a unique radio frequency (RF) signature; and
a special-purpose computer processor that compares an incoming channel impulse response (CIR) of the unique radio frequency (RF) signal signature corresponding to an incoming packet exchanged between a battery cell controller and a battery management unit inside the enclosure to a plurality of stored valid RF CIR signatures and executes a resemblance metric to accept or reject the incoming packet.

2. The battery pack of claim 1, wherein the network nodes are modules formed of an arrangement of battery cells.

3. The battery pack of claim 1, wherein the CIR of the unique RF signal signature is generated by a fixed spatial arrangement between an antenna of a transmitting module of the network nodes and an antenna of a receiving module of the network nodes inside the enclosure.

4. The battery pack of claim 1, wherein the incoming packet is received from an external malicious node, and the resemblance metric performs a calculation that compares a CIR of the incoming packet from the external malicious node to the plurality of stored valid RF CIR signatures to determine that the incoming packet is not a trusted packet.

5. The battery pack of claim 1, wherein the resemblance metric includes an Error Vector Magnitude (EVM) calculated for the CIR of the unique RF signature communication channel.

6. The battery pack of claim 5, wherein the special-purpose computer processor compares the EVM to a threshold value to determine whether the incoming packet is a trusted packet or an untrusted packet.

7. The battery pack of claim 6, wherein the trusted packet is generated from the battery cell controller inside the enclosure and the untrusted packet is generated from a wireless device external to the enclosure.

8. The battery pack of claim 1, wherein in response to comparing the measured CIR at the battery management unit with a previously-stored CIR of two nodes, the battery management unit establishes that one of the two nodes provides a message in the incoming packet that is trusted.

9. The battery pack of claim 1, wherein the resemblance metric is generated by a machine learning technique that characterizes the incoming CIR.

10. The battery pack of claim 1, wherein the special-purpose computer processor executes the resemblance metric for adaptation to slow changes in an RF signal of the incoming packet caused by the environment inside the enclosure.

11. The battery pack of claim 1, wherein the plurality of stored valid RF CIR signatures includes previous CIR signatures of the network nodes inside the enclosure, and wherein the special-purpose computer processor compares the incoming CIR to the previous CIR signatures to require the incoming packet to be sent from a predetermined known spatial location.

12. The battery pack of claim 2, wherein the incoming packet is received from an external malicious node, and the resemblance metric performs a calculation that compares a CIR of the incoming packet from the external malicious node to the plurality of stored valid RF CIR signatures to determine that the incoming packet is not a trusted packet.

13. The battery pack of claim 3, wherein in response to comparing the measured CIR at the battery management unit with a previously-stored CIR of two nodes, the battery management unit establishes that one of the two nodes provides a message in the incoming packet that is trusted.

14. The battery pack of claim 2, wherein in response to comparing the measured CIR at the battery management unit with a previously-stored CIR of two nodes, the battery management unit establishes that one of the two nodes provides a message in the incoming packet that is trusted.

15. The battery pack of claim 3, wherein in response to comparing the measured CIR at the battery management unit with a previously-stored CIR of two nodes, the battery management unit establishes that one of the two nodes provides a message in the incoming packet that is trusted.

16. The battery pack of claim 3, wherein the resemblance metric is generated by a machine learning technique that characterizes the incoming CIR.

17. The battery pack of claim 4, wherein the special-purpose computer processor executes the resemblance metric for adaptation to slow changes in an RF signal of the incoming packet caused by the environment inside the enclosure.

18. The battery pack of claim 4, wherein the plurality of stored valid RF CIR signatures includes previous CIR signatures of the network nodes inside the enclosure, and wherein the special-purpose computer processor compares the incoming CIR to the previous CIR signatures to require the incoming packet to be sent from a predetermined known spatial location.

19. The battery pack of claim 1, wherein the enclosure is characterized as a metal enclosure.

20. A method for network node identification according to channel characteristics, comprising:
   receiving, by a first RF node that includes a battery management unit in an enclosure of a battery pack, an electronic message from a second RF node that includes a battery cell controller and at least one battery cell in the enclosure, the electronic message having a unique CIR signature of a unique radio frequency RF signal signature;
   comparing the unique CIR signature of the electronic message to a plurality of stored valid CIR signatures; and
   generating a resemblance metric to accept or reject the electronic message in response to the comparison of the unique CIR signature and the plurality of stored valid CIR signatures.

21. The method of claim 20, wherein the resemblance metric includes an Error Vector Magnitude (EVM) calculated for the unique CIR signature, and wherein the method further comprises comparing the EVM to a threshold value to determine whether the message is part of a trusted packet or an untrusted packet.

22. The method of claim 20, wherein the enclosure is characterized as a metal enclosure.

* * * * *